(12) United States Patent
Jang et al.

(10) Patent No.: US 12,527,462 B2
(45) Date of Patent: Jan. 20, 2026

(54) ENDOSCOPE AND ENDOSCOPE SYSTEM

(71) Applicant: HOYA CORPORATION, Tokyo (JP)

(72) Inventors: Minsul Jang, Tokyo (JP); Kohei Iketani, Saitama (JP)

(73) Assignee: HOYA CORPORATION, Tokyo (JP)

( * ) Notice: Subject to any disclaimer, the term of this patent is extended or adjusted under 35 U.S.C. 154(b) by 219 days.

(21) Appl. No.: 18/293,083

(22) PCT Filed: Aug. 18, 2021

(86) PCT No.: PCT/JP2021/030255
§ 371 (c)(1),
(2) Date: Jan. 29, 2024

(87) PCT Pub. No.: WO2023/021630
PCT Pub. Date: Feb. 23, 2023

(65) Prior Publication Data
US 2024/0252028 A1 Aug. 1, 2024

(51) Int. Cl.
*A61B 1/00* (2006.01)
*A61B 1/05* (2006.01)

(52) U.S. Cl.
CPC ...... *A61B 1/00183* (2013.01); *A61B 1/00006* (2013.01); *A61B 1/00009* (2013.01);
(Continued)

(58) Field of Classification Search
CPC .......................... A61B 1/00183; A61B 1/0019
See application file for complete search history.

(56) References Cited

U.S. PATENT DOCUMENTS

2014/0152802 A1 6/2014 Olsson et al.
2014/0204187 A1 7/2014 Sasaki et al.
(Continued)

FOREIGN PATENT DOCUMENTS

JP S61-103116 A 5/1986
JP H02-148013 A 6/1990
(Continued)

OTHER PUBLICATIONS

Notice of Reasons for Refusal issued in Japanese Patent Application No. 2020-079296, dated Jul. 15, 2025, along with an English translation thereof.
(Continued)

*Primary Examiner* — Colin T. Sakamoto
(74) *Attorney, Agent, or Firm* — Greenblum & Bernstein, P.L.C.

(57) ABSTRACT

An endoscope that captures an image of a biological tissue in a body cavity includes: an image sensor configured to capture the image of the biological tissue; an objective lens that simultaneously forms, as captured images, a front-view image of the biological tissue obtained through a front window facing a front side of a light receiving surface of the image sensor and a side-view image of the biological tissue obtained through a side window facing a lateral side as compared with the front window, on the light receiving surface; and an optical element that is provided in at least one of the front window and the side window, and changes a visual field range of at least one of the front-view image and the side-view image by adjusting a deflection characteristic of incident light with a control signal.

9 Claims, 7 Drawing Sheets

(52) U.S. Cl.
CPC ........ *A61B 1/00177* (2013.01); *A61B 1/0019* (2013.01); *A61B 1/05* (2013.01)

(56) References Cited

U.S. PATENT DOCUMENTS

| | | |
|---|---|---|
| 2016/0015258 A1 | 1/2016 | Levin et al. |
| 2016/0242627 A1 | 8/2016 | Takahashi |
| 2018/0092515 A1* | 4/2018 | Yashiro .............. A61B 1/00181 |
| 2019/0216300 A1 | 7/2019 | Levy |
| 2020/0015666 A1 | 1/2020 | Levy |
| 2020/0129053 A1 | 4/2020 | Levy |
| 2023/0157526 A1 | 5/2023 | Jang et al. |

FOREIGN PATENT DOCUMENTS

| | | | |
|---|---|---|---|
| JP | H09-313435 A | 12/1997 | |
| JP | H10-174673 A | 6/1998 | |
| JP | 2006-235346 A | 9/2006 | |
| JP | 2009-213631 A | 9/2009 | |
| JP | 2013-066646 A | 4/2013 | |
| JP | 2015-119827 A | 7/2015 | |
| JP | 2017-527332 A | 9/2017 | |
| JP | 2018-57605 A | 4/2018 | |
| JP | 2018-57799 A | 4/2018 | |
| JP | 2019-080992 A | 5/2019 | |
| JP | 2019-530508 A | 10/2019 | |
| KR | 102268777 B1 * | 6/2021 | ........... A61B 1/0019 |
| WO | 2015/002847 A2 | 1/2015 | |
| WO | 2015/122354 A1 | 8/2015 | |

OTHER PUBLICATIONS

Search Report issued in WIPO Patent Application No. PCT/JP2021/030255, dated Sep. 26, 2023, along with an English translation thereof.

Notice of Reasons for Refusal issued in Japanese Patent Application No. 2020-079296, dated Sep. 26, 2023, along with an English translation thereof.

Decision of Refusal issued in Japanese Patent Application No. 2020-079296, dated Feb. 13, 2024, along with an English translation thereof.

* cited by examiner

ENDOSCOPE AND ENDOSCOPE SYSTEM

TECHNICAL FIELD

The present invention relates to an endoscope that captures a biological tissue in a body cavity, and an endoscope system.

BACKGROUND ART

An endoscope is a device that includes an image sensor inserted into a body cavity of a human body or the like and capturing a biological tissue on an inner surface of the body cavity. The endoscope is inserted into, for example, the large intestine, and displays a captured image on a monitor in order to determine presence or absence of an unhealthy site, for example, presence or absence of a lesion site, in a biological tissue. When the biological tissue in the large intestine is diagnosed, it is necessary to determine whether or not there is a lesion site on a base part of a fold by pushing the fold down in one direction while pulling the endoscope in one direction so that the fold protruding from an inner surface does not interfere with the image capturing. However, a lesion site may be present on a portion hidden in a shadow of the fold even when the fold is pushed down in one direction. Further, when a visual field of an image to be captured is narrow, it may be difficult to capture an image of a portion between adjacent folds.

Therefore, in order to capture the image of the portion between the folds in various directions without pushing the fold down, an objective lens having a wide viewing angle may be used for an objective optical system of the image sensor.

Further, there is known an endoscope system including: an endoscope that includes an insertion portion to be inserted into a tube of an observation target, a front-view observation unit having a visual field in a direction of a distal tip of the insertion portion, a side-view observation unit having a visual field in a direction of a side surface of the insertion portion, and a protrusion protruding from the insertion portion and forming a blind spot in the visual field of the side-view observation unit; and an image acquisition unit that acquires a front-view observation image using the front-view observation unit and acquires a side-view observation image using the side-view observation unit (JP 2018-57799 A).

SUMMARY OF INVENTION

Technical Problem

In the above-described endoscope system, since the front-view observation image and the side-view observation image can be simultaneously acquired, a wide range of the observation target can be displayed on a display unit.

However, between the front-view observation image and the side-view observation image, a blind spot area that does not appear in both images may be generated. That is, a lesion site displayed in the side-view observation image may disappear along with movement of the endoscope, and then suddenly appear in the front-view observation image. Further, between the front-view observation image and the side-view observation image, an overlapping area that appears in both images may be generated. That is, a lesion site may be present in the overlapping area, and the lesion site may be simultaneously present in the side-view observation image and the front-view observation image.

Such simultaneous image display of the images having discontinuous visual field ranges gives a sense of discomfort to an endoscope operator. Further, it is likely to cause erroneous diagnosis by overlooking a lesion site in the blind spot area and erroneously counting the number of lesion sites in the overlapping area.

Therefore, an object of the present invention is to provide an endoscope and an endoscope system capable of achieving smooth visual field ranges while suppressing a blind spot area and an overlapping area when a front-view image of a biological tissue obtained through a front window facing a front side of a light receiving surface of an image sensor and a side-view image of the biological tissue obtained through a side window facing a lateral side as compared with the front window are simultaneously captured as captured images.

Solution to Problem

An aspect of the present invention is an endoscope that captures an image of a biological tissue in a body cavity, and the endoscope includes:
  an image sensor configured to capture the image of the biological tissue;
  an objective lens that simultaneously forms, as captured images, a front-view image of the biological tissue obtained through a front window facing a front side of a light receiving surface of the image sensor and a side-view image of the biological tissue obtained through a side window facing a lateral side as compared with the front window, on the light receiving surface; and
  an optical element that is provided in at least one of the front window and the side window, and changes a visual field range of at least one of the front-view image and the side-view image by adjusting a deflection characteristic of incident light with a control signal.

It is preferable that
  a control unit that generates the control signal is further included, and
  the control unit generates the control signal such that at least one of a decrease in an overlapping area overlapping between the front-view image and the side-view image in the captured images including the front-view image and the side-view image and a decrease in a blind spot area in visual fields of the captured images is achieved.

It is preferable that the control unit generates the control signal by extracting the overlapping area between the front-view image and the side-view image from pixel values of the captured images, and determining the deflection characteristic of the incident light according to a size of the overlapping area.

It is preferable that the control unit includes a prediction model obtained by performing machine learning in advance of a relationship between the captured images including the front-view image and the side-view image and the size of the overlapping area, and determines, using the prediction model, the deflection characteristic of the incident light by obtaining presence or absence and the size of the overlapping area from the pixel values of the captured images of the biological tissue captured by the image sensor.

It is preferable that the control unit generates the control signal by obtaining a size of the blind spot area between the front-view image and the side-view image from an amount of positional displacement at an end of the front-view image or the side-view image between an image of a linearly extending portion in the front-view image of the biological tissue captured by the image sensor and an image of the linearly extending portion in the side-view image, and determining the deflection characteristic of the incident light according to the size.

It is preferable that the control unit includes a prediction model obtained by performing machine learning in advance of a relationship between a positionally displaced position and an amount of positional displacement of the linearly extending portion in the captured images and the size of the blind spot area, and determines, using the prediction model, the change amount by obtaining presence or absence and the size of the blind spot area from the positionally displaced position and the amount of positional displacement of the linearly extending portion obtained from the pixel values of the captured images of the biological tissue captured by the image sensor.

It is preferable that the side-view window is provided so as to circle in a circumferential direction of a cylindrical member surrounding the image sensor, and the optical element is provided at each of a plurality of positions along the circumferential direction such that the deflection characteristic has a distribution in the circumferential direction.

It is preferable that a maximum half angle of view of the objective lens is 90 degrees or more.

Another aspect of the present invention is an endoscope system including: an endoscope that captures an image of a biological tissue in a body cavity; and a processor for an endoscope that performs image processing on the image of the biological tissue captured by the endoscope, and the endoscope includes:

an image sensor configured to capture the image of the biological tissue;

an objective lens that simultaneously forms, as captured images, a front-view image of the biological tissue obtained through a front window facing a front side of a light receiving surface of the image sensor and a side-view image of the biological tissue obtained through a side window facing a lateral side as compared with the front window, on the light receiving surface; and an optical element that is provided in at least one of the front window and the side window, and changes a visual field range of at least one of the front-view image and the side-view image by adjusting a deflection characteristic of incident light with a control signal, the processor for an endoscope includes an image processing unit that generates a control signal for performing image processing on the image of the biological tissue and controlling the deflection characteristic of the incident light, and the image processing unit generates the control signal such that at least one of a decrease in an overlapping area overlapping between the front-view image and the side-view image in the captured images including the front-view image and the side-view image and a decrease in a blind spot area in visual fields of the captured images is satisfied.

Advantageous Effects of Invention

According to the endoscope and the endoscope system described above, it is possible to achieve smooth visual field ranges while suppressing a blind spot area and an overlapping area when a front-view image and a side-view image of a biological tissue are simultaneously captured as captured images.

DESCRIPTION OF EMBODIMENTS

Figure 1:
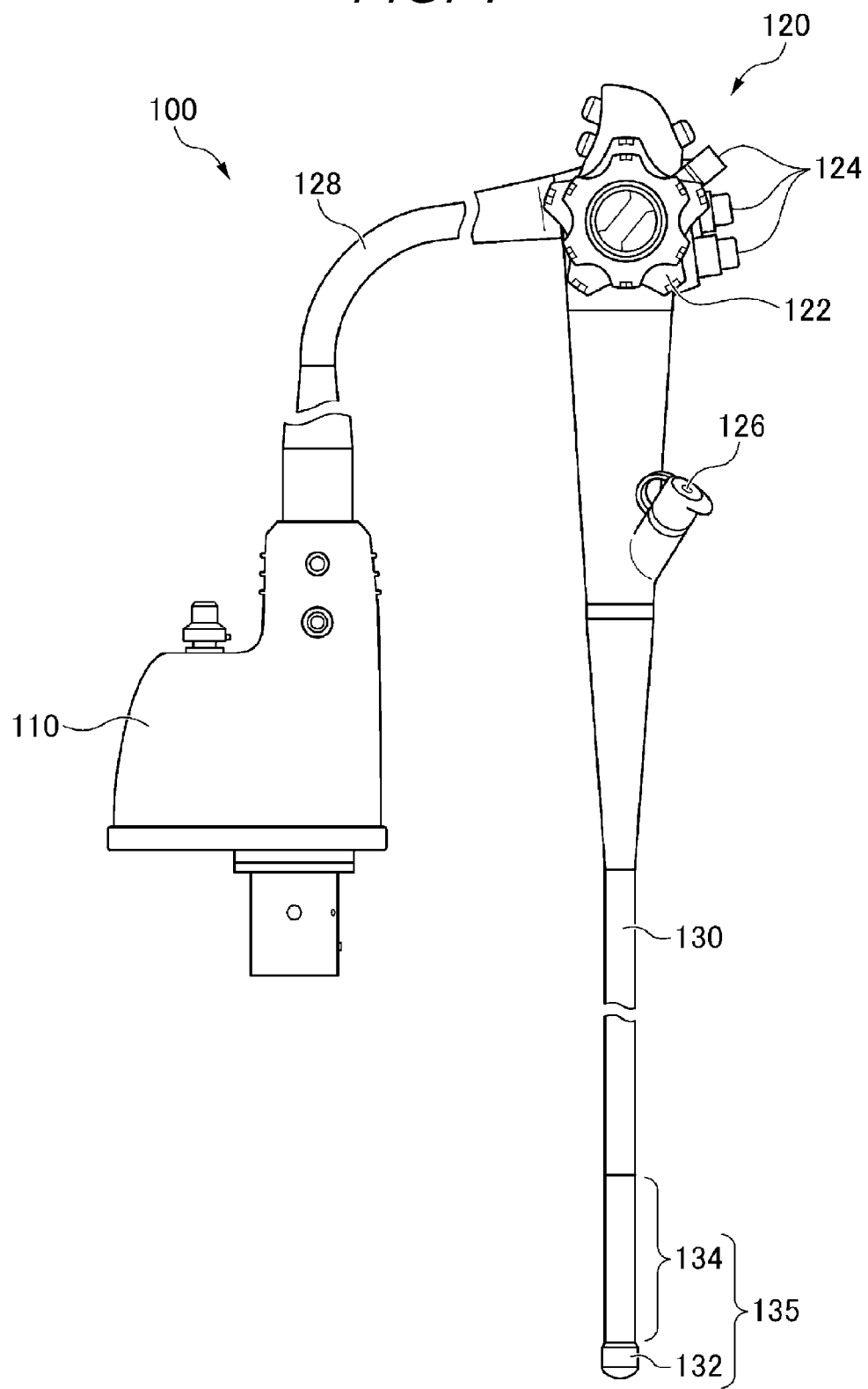
FIG. 1 is an external perspective view of an endoscope according to an embodiment.
Figure 2:
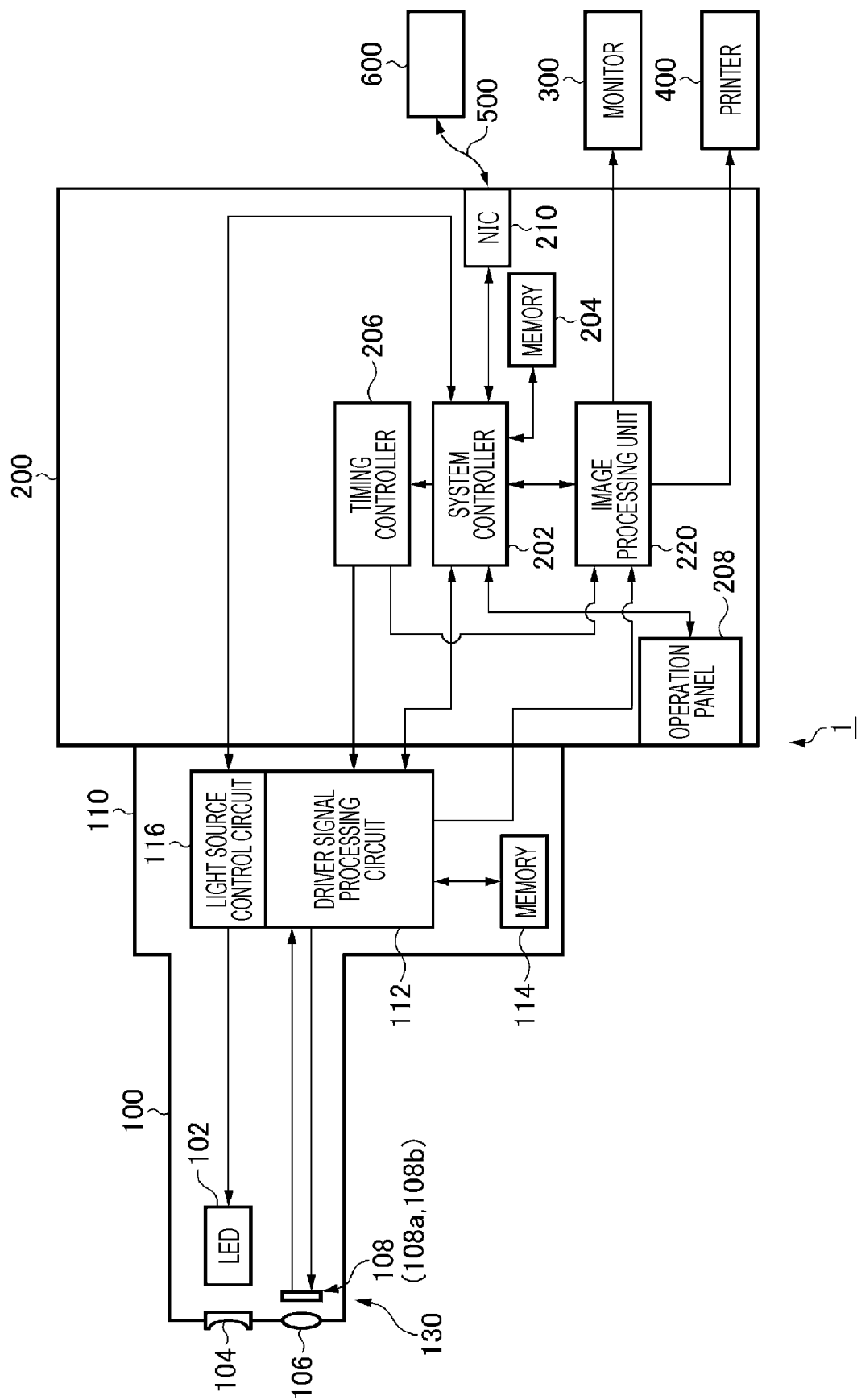
FIG. 2 is a block diagram illustrating a configuration of an endoscope system according to the embodiment.
Figure 3:
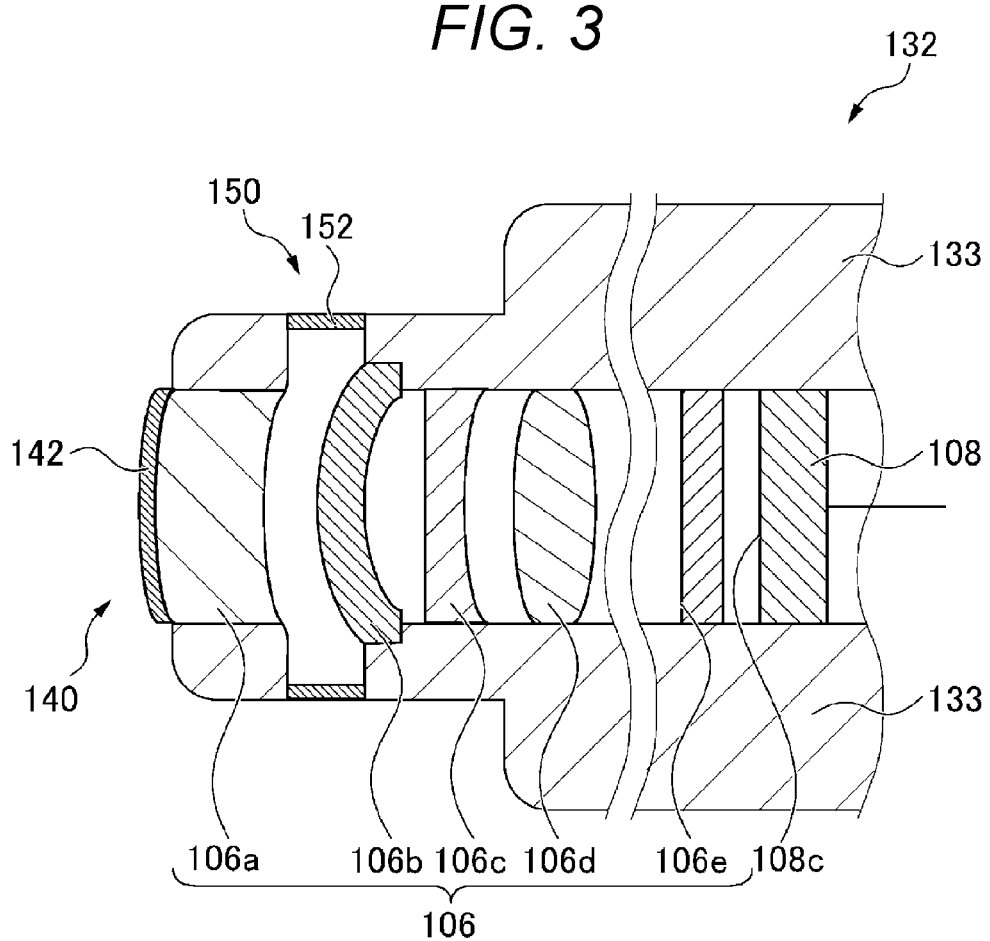
FIG. 3 is a view illustrating an example of a configuration of a distal tip of the endoscope according to the embodiment.

Hereinafter, an endoscope and an endoscope system according to an embodiment of the present invention will be described with reference to the drawings. FIG. 1 is an external perspective view of an endoscope according to an embodiment. FIG. 2 is a block diagram illustrating a configuration of an endoscope system according to the embodiment. FIG. 3 is a view illustrating an example of a configuration of a distal tip of the endoscope according to the embodiment.

An endoscope (hereinafter, referred to as an electronic scope) 100 illustrated in FIG. 1 is connected to a processor 200 for an electronic endoscope illustrated in FIG. 2 to form an endoscope system 1. The endoscope system 1 is a system specialized for medical use, and mainly includes the electronic scope 100, the processor 200 for an electronic endoscope, and a monitor 300 as illustrated in FIG. 2. Each of the electronic scope 100 and the monitor 300 is connected to the processor 200.

As illustrated in FIG. 1, the electronic scope 100 mainly includes a connector 110, an operation unit 120, and a distal tip 132, and further includes a flexible cable 130 that extends from the operation unit 120 toward the distal tip 132 on a front side of the operation unit 120 and has flexibility, a bending tube 134 that is connected to a front side of the flexible cable 130 via a connecting portion and freely bendable, and a universal tube 128 that extends rearward from the operation unit 120. The connector 110 is fixed to a rear end of the universal tube 128 and is configured to be connected to the processor 200.

A plurality of bending operation wires is inserted into the operation unit 120, the flexible cable 130, and the bending tube 134, a distal tip of each bending operation wire is connected to a rear end of the bending tube 134, and a rear end of each bending operation wire is connected to a bending operation knob 122 of the operation unit 120. The bending tube 134 is bent at any angle in any direction according to an operation of the bending operation knob 122.

Moreover, the operation unit 120 includes a plurality of operation buttons 124. When an endoscope operator (operator or assistant) presses the operation button 124, the operation button 124 can instruct functions such as discharge of water and gas from an air/water supply port (not illustrated) provided on a distal surface of the distal tip 132, suction of liquid and gas in a biological tissue through a suction port, and discharge of a cleaning liquid from a cleaning liquid discharge nozzle for cleaning an objective lens.

The distal tip 132 at a distal tip of the bending tube 134 is made of a hard resin material (for example, ABS, modified PPO, PSU, and the like) that is not substantially elastically deformed.

Inside the distal tip 132, an LED light source 102 and an image sensor 108 positioned immediately behind an objective lens 106 are provided. That is, the distal tip 132 provided at a distal tip of the elongated flexible cable 130 includes the LED light source 102, the objective lens 106, and the image sensor 108. The objective lens 106 is provided on a front surface of the image sensor 108, and forms an image of a biological tissue on a light receiving surface of the image sensor 108 in a visual field range of a viewing angle of 180 degrees or more, preferably more than 180 degrees. The distal tip 132 is provided with a front window facing a front side of the light receiving surface of the image sensor 108 and a side window facing a lateral side as compared with the front window as will be described later, and the image sensor 108 is configured to capture images formed on the light receiving surface by the objective lens 106 through the front window and the side window. The front window and the side window are provided with optical elements capable of variably adjusting a deflection direction (deflection characteristic) of incident light to be described later. Here, the front window facing the front side refers to a window in which a direction of the center of a visual field range seen from the front window is front. The front refers to a direction in which the distal surface of the distal tip 132 faces. The direction of the side window is a direction of the center of a visual field range seen from the side window. The side window only needs to be faced such that the visual field range includes a large portion of a lateral area relative to the visual field range of the front window, and the direction of the side window only needs to be inclined relative to the direction of the front window in a range of, for example, 30 to 90 degrees. In the following description, description will be given using a mode in which the direction of the side window faces a lateral direction orthogonal to the front.

The flexible cable 130, the bending tube 134, and the distal tip 132 form an insertion portion 135 that is inserted into a body cavity. A cable for an image signal extending from the image sensor 108 provided at the distal tip 132 extends from the distal tip 132 to the inside of the connector 110 through the inside of the bending tube 134, the flexible cable 130, the operation unit 120, and the universal tube 128. The connector 110 is connected to the processor 200. The processor 200 processes an image signal transmitted from the image sensor and controls an image of an object captured by the image sensor 108 to be displayed on the monitor 300.

As illustrated in FIG. 2, the processor 200 of the endoscope system 1 includes a system controller 202 and a timing controller 206. The system controller 202 executes various programs stored in a memory 204, and integrally controls the entire electronic endoscope system 1. Further, the system controller 202 changes various settings of the electronic endoscope system 1 in accordance with an instruction of an endoscope operator (operator or assistant) which is input to an operation panel 208. The timing controller 206 outputs a clock pulse for adjusting operation timing of each unit to each circuit in the electronic endoscope system 1.

The distal tip 132 of the electronic scope 100 is provided with the LED light source 102 in addition to the image sensor 108. The LED light source 102 emits illumination light to illuminate a biological tissue for image capturing by the image sensor 108.

The LED light source 102 is driven by a drive signal generated by a light source control circuit 116 provided in the connector 110 to emit light. Instead of the LED light source 102, a laser element may be used, and a high-brightness lamp, for example, a xenon lamp, a metal halide lamp, a mercury lamp, or a halogen lamp may be used.

In the example illustrated in FIG. 2, the LED light source 102 is provided in the distal tip 132, but may be provided as a light source device in the connector 110 or the processor 200. In this case, from the light source device to the distal tip 132, the illumination light is guided to the distal tip 132 through a light guide in which a plurality of fiber cables is bundled.

The light emitted from the LED light source 102 is emitted as the illumination light to a biological tissue, which is an object, via a light distribution lens 104. Light reflected from the biological tissue forms optical images on the light receiving surface of the image sensor 108 through a front window 140, a side window 150 (see FIG. 3), and the objective lens 106.

The image sensor 108 is, for example, a single-plate color charge-coupled device (CCD) image sensor in which various filters such as an infrared (IR) cut filter 108$a$ and a Bayer-arrayed color filter 108$b$ are arranged on the light receiving surface, and generates primary color signals of red (R), green (G), and blue (B) according to the optical image formed on the light receiving surface. Instead of the single-plate color CCD image sensor, a single-plate color complementary metal oxide semiconductor (CMOS) image sensor can be used. In this way, the electronic scope 100 uses the image sensor 108 to capture an image of a biological tissue inside an organ and generate a moving image.

The electronic scope 100 includes a driver signal processing circuit 112 provided inside the connector 110. The driver signal processing circuit 112 generates an image signal (brightness signal Y or color difference signal Cb or Cr) by performing predetermined signal processing such as color interpolation or a matrix calculation on the primary color signal input from the image sensor 108, and outputs the generated image signal to an image processing unit 220 of the processor 200 for an electronic endoscope. Further, the driver signal processing circuit 112 accesses a memory 114, and reads specific information of the electronic scope 100.

The specific information of the electronic scope 100 recorded in the memory 114 includes, for example, the number of pixels or sensitivity of the image sensor 108, a frame rate with which the electronic scope 100 is operable, and a model number. The driver signal processing circuit 112 outputs the specific information read from the memory 114 to the system controller 202.

The system controller 202 performs various types of calculation based on the information stored in the memory 204 and the specific information of the electronic scope 100, and generates a control signal. The system controller 202 controls an operation and timing of each circuit inside the processor 200 for an electronic endoscope by using the generated control signal so that processing suitable for the electronic scope 100 connected to the processor 200 for an electronic endoscope is performed.

The timing controller 206 supplies a clock pulse to the driver signal processing circuit 112, the image processing unit 220, and a light source unit 230 according to the timing control by the system controller 202. The driver signal processing circuit 112 performs driving control of the image sensor 108 at timing synchronized with a frame rate of a video image processed on a side of the processor 200 for an electronic endoscope in accordance with the clock pulse supplied from the timing controller 206.

Under the control of the system controller 202, the image processing unit 220 generates a video signal for monitor display of an image or the like based on the image signal input from the driver signal processing circuit 112, and outputs the video signal to the monitor 300. Moreover, the image processing unit 220 is configured to generate, according to content of a captured image, a control signal for adjusting a deflection direction of incident light incident on optical elements provided in the front window 140 and the side window 150 illustrated in FIG. 3 provided in the distal tip 132, and adjust the deflection direction of the incident light. Further, the image processing unit 220 may perform, on an image of a biological tissue obtained by the electronic scope 100, quantification processing for quantifying a feature amount of each pixel of the image with which a lesion site can be distinguished from a healthy site to evaluate a degree of progression of the lesion site of the image, and further generate a color map image in which a numerical value of each pixel obtained by the quantification processing is replaced with a color. In this case, the image processing unit 220 generates a video signal for monitor display of information regarding a result of the quantification processing and the color map image, and outputs the video signal to the monitor 300. As a result, an endoscope operator can accurately perform an examination through the image displayed on a display screen of the monitor 300. The image processing unit 220 outputs the image, the information regarding the result of the quantification processing, and the color map image to a printer 400 as necessary.

The processor 200 is connected to a server 600 via a network interface card (NIC) 210 and a network 500. The processor 200 can download information regarding an examination using the endoscope (for example, electronic health record information of a patient and information regarding an operator) from the server 600. The downloaded information is displayed on, for example, the display screen of the monitor 300 or the operation panel 208. Further, the processor 200 can cause the server 600 to store an examination result of the electronic scope 100 by uploading the examination result to the server 600.

In such an electronic scope 100, when a front-view image of a biological tissue captured through the front window 140 (see FIG. 3) and a side-view image of the biological tissue captured through the side window 150 (see FIG. 3) are simultaneously captured as captured images and displayed on the monitor 300, it is not preferable that the same lesion site simultaneously appears in the side-view image and the front-view image due to an overlapping area appearing in both images. Further, displaying the captured images in which the front-view image and the side-view image are discontinuous on the monitor 300 gives a sense of discomfort to an endoscope operator. Moreover, in a case where there is a blind spot area between the side-view image and the front-view image, it is not preferable to overlook a lesion site in the blind spot area.

Therefore, as illustrated in FIG. 3, the front window 140 (see FIG. 3) and the side window 150 (see FIG. 3) of the distal tip 132 of the electronic scope 100 are provided with optical elements 142 and 152 that change a visual field range of at least one of the front-view image and the side-view image by adjusting the deflection characteristic of the incident light with the control signal. Hereinafter, this point will be described.

The distal tip 132 includes the objective lens 106, the image sensor 108, the front window 140, and the side window 150. The objective lens 106 and the image sensor 108 are arranged in a cylindrical member 133 made of the hard resin material of the distal tip 132. The front window 140 and the side window 150 are provided with the optical elements 142 and 152.

The front window 140 faces a front side of a light receiving surface 108c of the image sensor 108. The side window 150 faces a direction orthogonal to the front side.

The objective lens 106 includes a lens group of lenses 106a to 106e including a meniscus lens, a convex lens, and a concave lens, and a half angle of view thereof is 90 degrees or more, preferably more than 90 degrees, and more preferably 110 degrees or more. Therefore, the objective lens 106 simultaneously forms a front-view image of a biological tissue obtained through the front window 140 and a side-view image of the biological tissue obtained through the side window 150 on the light receiving surface 108c as captured images. A surface of a lens 106a on a side of an object also serves as the front window 140.

The optical elements 142 and 152 are, for example, thin-film elements that change a visual field range of at least one of a front-view image and a side-view image by adjusting a deflection direction of incident light incident on the optical elements 142 and 152 with a control signal.

For example, a liquid crystal lens is used as the optical elements 142 and 152. As the liquid crystal lens, for example, well-known one known in JP 5156999 B2, JP 6128719 B1, or the like can be used. The liquid crystal lens is, for example, an element in which a liquid crystal cell obtained by sealing a nematic liquid crystal in a gap generated by inclining and arranging glass substrates in a non-parallel manner is formed, a voltage is applied to the liquid crystal cell, and the voltage is adjusted to control an array of liquid crystal, whereby a refractive index is continuously changed, and a deflection direction of incident light can be continuously changed. As the optical elements 142 and 152, a variable focus lens using an electro-optical crystal whose refractive index changes depending on an applied voltage, for example, potassium tantalate niobate may be used. Further, as the optical elements 142 and 152, a liquid lens that changes a deflection direction of incident light by changing a curvature radius may be used.

Alternatively, as the optical elements 142 and 152, a diffractive optical element can be used. For example, a deflection direction of incident light can be changed by applying, to the optical elements 142 and 152, an active diffractive optical element having a movable grating configuration in which displacement of a beam of a reflective grating is changed using electrostatic force according to an applied voltage.

Figure 4:
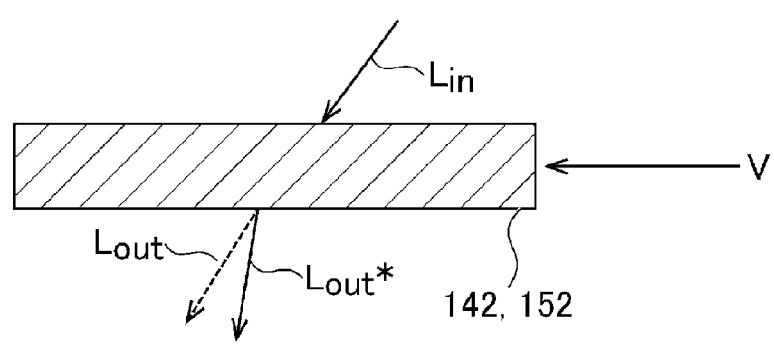
FIG. 4 is a diagram for describing an example of a deflection direction of incident light incident on optical elements used in the endoscope according to the embodiment.

FIG. 4 is a diagram for describing an example of a deflection direction of incident light incident on the optical elements 142 and 152. As illustrated in FIG. 4, incident light $L_{in}$ changes emitted light $L_{out}$ before control to $L_{out}^*$ by applying a control signal V. That is, the optical elements 142 and 152 change a deflection direction of the incident light $L_{in}$ with the control signal V.

Therefore, by providing the optical elements 142 and 152 on a front surface of the objective lens 106, a visual field range of an image formed on the light receiving surface 108c through the objective lens 106 and the optical elements 142 and 152 can be narrowed or widened by the application of the control signal V.

Figure 5:
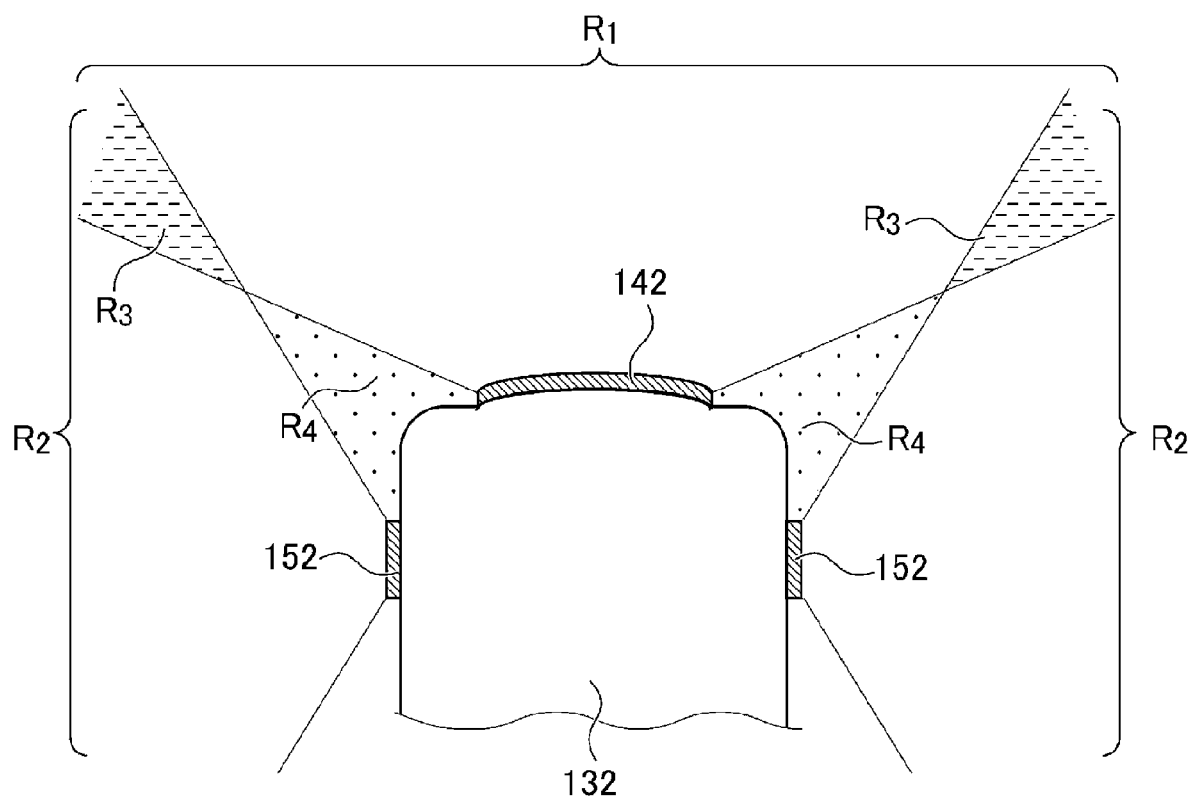
FIG. 5 is a diagram schematically illustrating a visual field range through a front window and a visual field range through a side window of the endoscope according to the embodiment.

FIG. 5 is a diagram schematically illustrating a visual field range $R_1$ through the front window 140 and a visual field range $R_2$ through the side window 150 of the electronic scope 100 according to the embodiment. In the example illustrated in FIG. 5, the visual field ranges when deflection characteristics of the optical elements 142 and 152 are not adjusted is illustrated.

As illustrated in FIG. 5, the visual field range of the image formed on the light receiving surface 108c includes an overlapping area $R_3$ overlapping both the visual field range $R_1$ and the visual field range $R_2$. Further, there is a blind spot area $R_4$ that is not included in both the visual field range $R_1$ and the visual field range $R_2$. Therefore, when an image of a biological tissue is captured, a lesion site may be in the blind spot area $R_4$ or may be in the overlapping area $R_3$.

Figure 6:
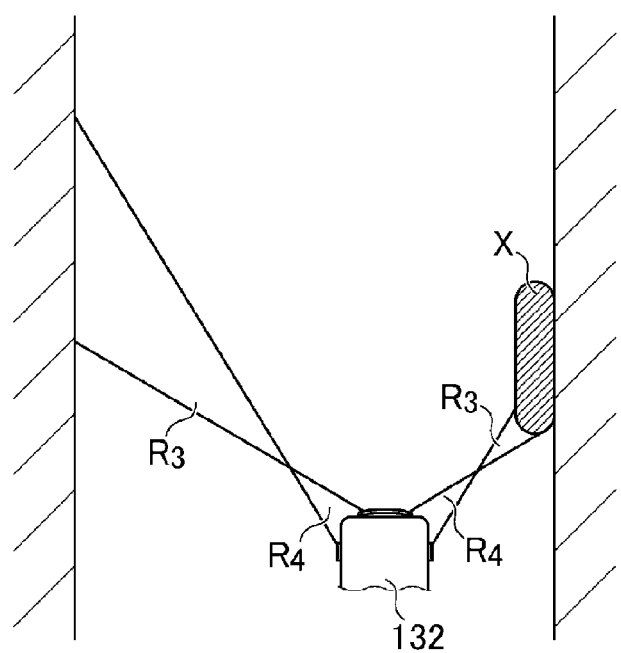
FIG. 6 is a diagram illustrating an example of an insertion state of the distal tip of the endoscope in an organ according to the embodiment.
Figure 7:
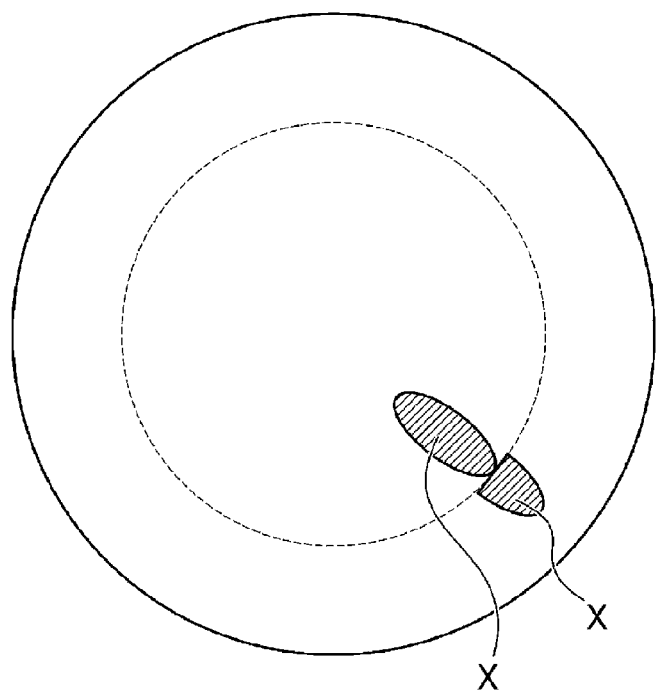
FIG. 7 is a diagram illustrating an example of an image displayed on a monitor in the insertion state of the distal tip illustrated in FIG. 6.

FIG. 6 is a diagram illustrating an example of an insertion state of the distal tip 132 of the electronic scope 100 in an organ. In FIG. 6, since the distal tip 132 is positioned to be biased to a right side in the organ, a portion of a lesion site X is positioned in the overlapping area $R_3$, and a remaining portion is in the visual field range $R_1$. FIG. 7 is a diagram illustrating an example of an image displayed on the monitor 300 in the insertion state of the distal tip 132 illustrated in FIG. 6. The visual field range $R_2$ is arranged around the visual field range $R_1$ and displayed as one image on the monitor 300. When there is the lesion site in the overlapping area $R_3$ of the visual field range $R_1$ and the visual field range $R_2$, as illustrated in FIG. 7, the lesion site X is displayed in a discontinuous and overlapping manner. A circular dotted line in FIG. 7 indicates a boundary between an end of the visual field range seen from the front window 140 and an end of the visual field range seen from the side window 150. In FIG. 7, the end of the visual field range seen from the front window 140 and the end of the visual field range seen from the side window 150 overlap each other on the screen of the monitor 300. Therefore, in FIG. 7, the overlapping area $R_3$ is present inside and outside the dotted line.

In order to determine a size of the lesion site X and a degree of progression of the lesion while viewing the image, it is not preferable that the lesion site X of interest is displayed in a discontinuous and overlapping manner in this way. Further, the display of the lesion site X which is discontinuous and having the overlapping portion is inconvenient for an endoscope operator, and gives a sense of discomfort to the endoscope operator.

Figure 8:
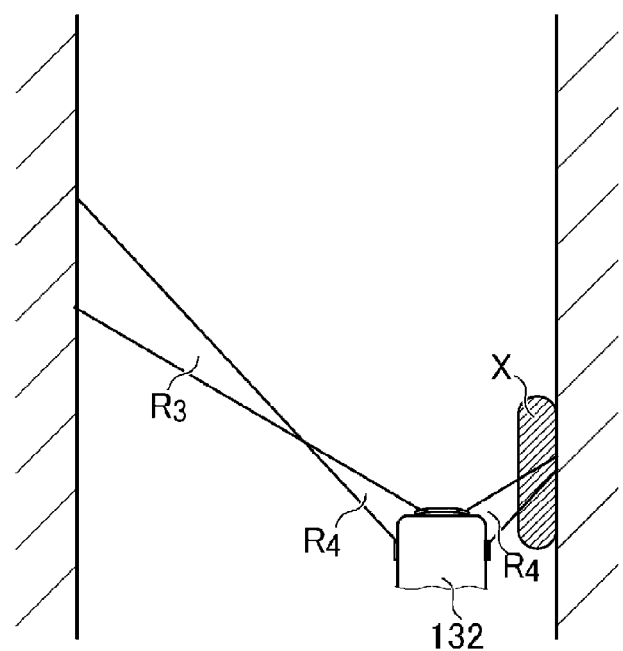
FIG. 8 is a diagram illustrating another example of the insertion state of the distal tip of the endoscope in the organ according to the embodiment.
Figure 9:
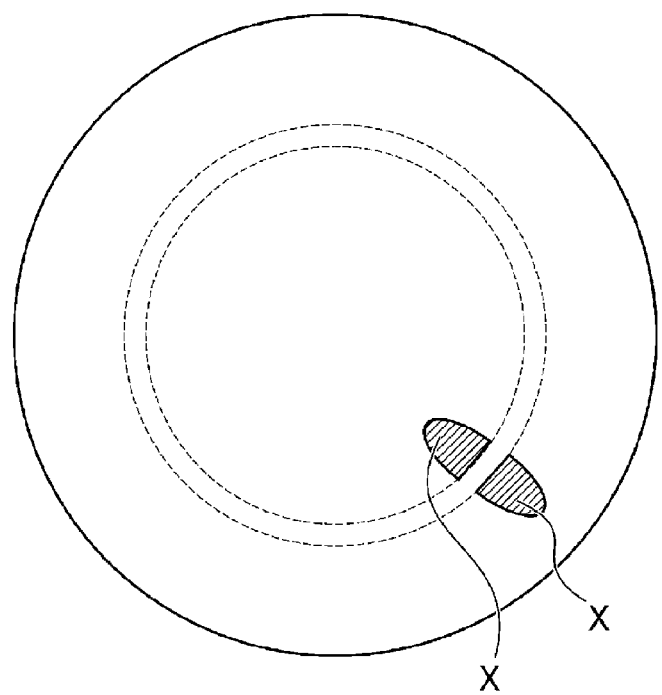
FIG. 9 is a diagram illustrating an example of an image displayed on the monitor in the insertion state of the distal tip illustrated in FIG. 8.

FIG. 8 is a diagram illustrating another example of the insertion state of the distal tip 132 of the electronic scope 100 in the organ. In FIG. 8, since the distal tip 132 is positioned to be biased more to the right side in the organ than in the example illustrated in FIG. 6, a portion of the lesion site X is positioned in the blind spot area $R_4$. FIG. 9 is a diagram illustrating an example of an image displayed on the monitor 300 in the insertion state of the distal tip 132 illustrated in FIG. 8. The visual field range $R_2$ is arranged around the visual field range $R_1$ and displayed as one image on the monitor 300. Two circular dotted lines in FIG. 9 indicate the end of the visual field range seen from the front window 140 and the end of the visual field range seen from the side window 150. Therefore, an area between the two dotted lines corresponds to the blind spot area $R_4$. In this case, a portion of the lesion site X in the blind spot area $R_4$ disappears and is displayed discontinuously as illustrated in FIG. 9. In such a case, since an endoscope operator may erroneously determine that there are two lesion sites X, it is not preferable to form the blind spot area $R_4$ in which the lesion site X partially disappears.

Figure 10:
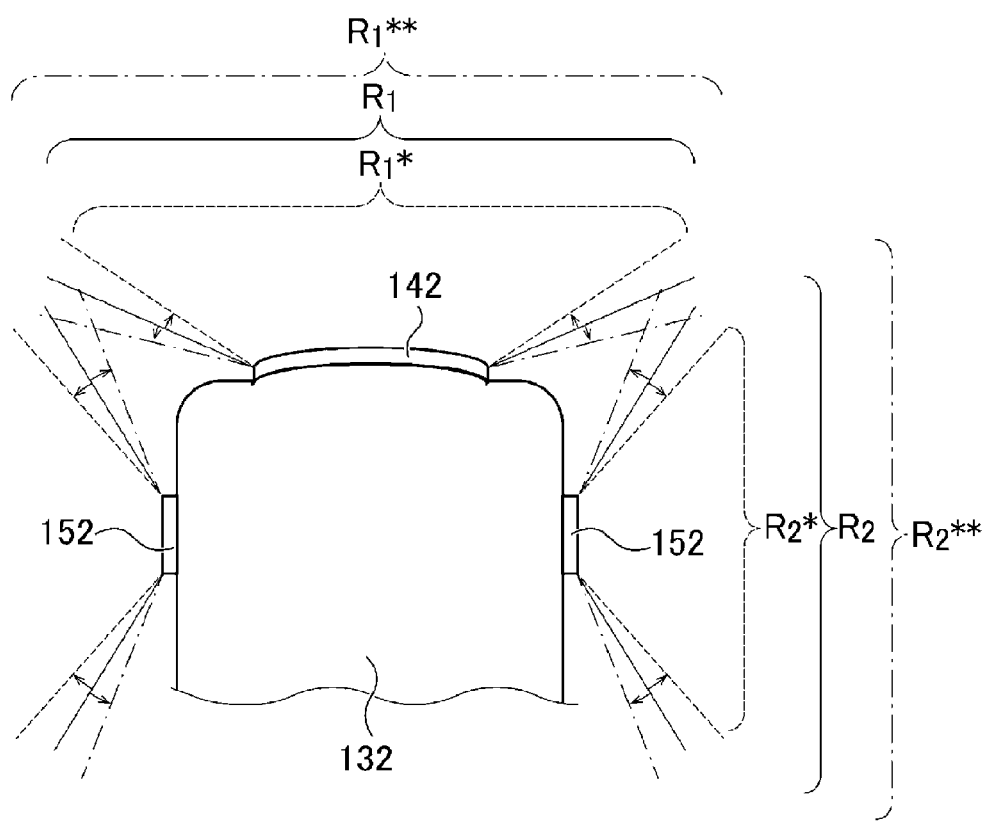
FIG. 10 is a diagram for describing changes in visual field ranges obtained by adjusting the deflection direction of the incident light incident on the optical elements used in the endoscope according to the embodiment.

FIG. 10 is a diagram for describing changes in visual field ranges obtained through the optical elements 142 and 152 and the objective lens by adjusting the deflection direction of the incident light incident on the optical elements 142 and 152.

By adjusting the optical element 142 with the control signal V, a range of a front-view image formed on the light receiving surface 108c becomes from the visual field range $R_1$ to a visual field range $R_1^*$ (narrows) or to a visual field range $R_1^{**}$ (widens). Similarly, by adjusting the optical element 152 with the control signal V, a range of a side-view image formed on the light receiving surface 108c becomes from the visual field range $R_2$ to a visual field range $R_2^*$ (narrows) or to a visual field range $R_2^{**}$ (widens).

Figure 11:
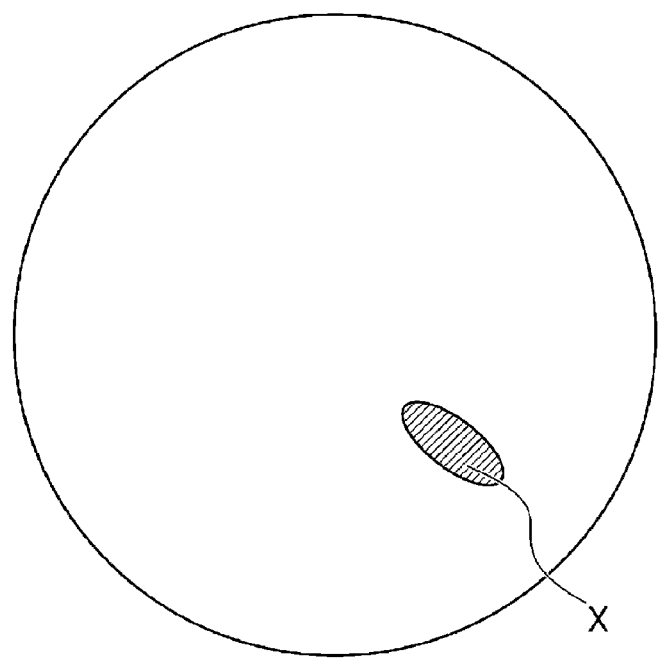
FIG. 11 is a diagram illustrating an example of an image displayed on the monitor obtained by adjusting deflection characteristics of the optical elements used in the endoscope according to the embodiment.

Therefore, in a case where there is the overlapping area $R_3$ when the distal tip 132 is inserted into an organ and an image of a biological tissue is captured, the deflection characteristic of at least one of the optical element 142 and the optical element 152 is adjusted so as to narrow at least one of the visual field range $R_1$ and the visual field range $R_2$. Further, in a case where there is the blind spot area $R_4$ when the distal tip 132 is inserted into an organ and an image of a biological tissue is captured, the deflection characteristic of at least one of the optical element 142 and the optical element 152 is adjusted so as to widen at least one of the visual field range $R_1$ and the visual field range $R_2$. As a result, it is possible to eliminate an overlapping portion or a disappeared portion in the image of the lesion site X. FIG. 11 is a diagram illustrating an example of an image displayed on the monitor 300 obtained by adjusting the deflection characteristics of the optical elements 142 and 152 used in the electronic scope 100 according to the embodiment. The discontinuity in the display of the lesion site X is eliminated and there is no disappearance.

In this way, the optical elements 142 and 152 that adjust the deflection characteristic (deflection direction) of the incident light are provided in the front window 140 and the side window 150 of the distal tip 132, and the deflection characteristic of the incident light is adjusted with the control signal V, so that the visual field range of at least one of the front-view image and the side-view image is changed. Therefore, when a front-view image and a side-view image of a biological tissue are simultaneously captured as captured images, smooth visual field ranges can be achieved while suppressing a blind spot area and an overlapping area.

Note that the optical elements 142 and 152 are provided in both the front window 140 and the side window 150 of the distal tip 132. However, the optical element may be provided in at least one of the front window 140 and the side window 150 and the deflection characteristic of the incident light may be adjusted with the control signal to change the visual field range of at least one of the front-view image and the side-view image.

Figure 12:
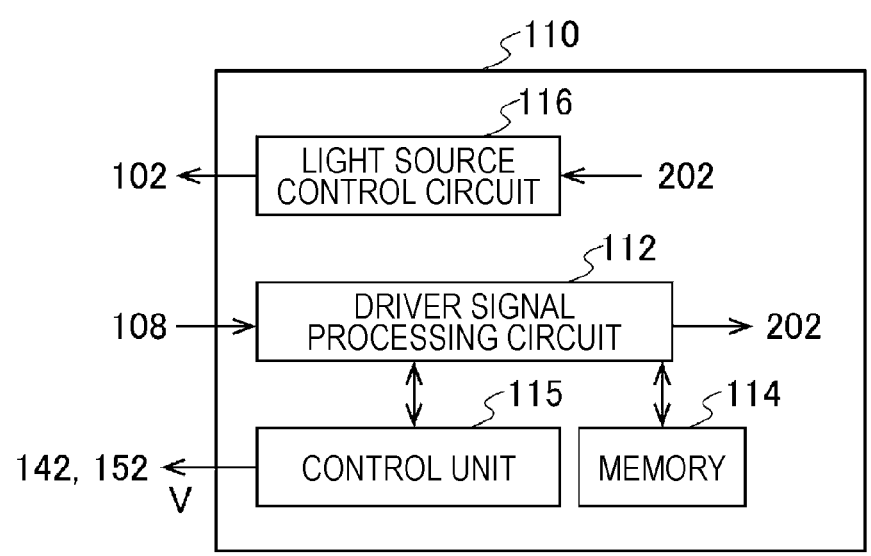
FIG. 12 is a diagram illustrating an example of a configuration of a connector including a control unit of the endoscope according to the embodiment.

According to the embodiment, such adjustment of the deflection direction of the incident light incident on the optical elements 142 and 152 is performed with the control signal V generated by the image processing unit 220 of the processor 200. According to the embodiment, the control signal V is generated in a control unit provided in the electronic scope 100. FIG. 12 is a diagram illustrating an example of a configuration of the connector 110 including the control unit of the electronic scope 100 according to the embodiment. In the example illustrated in FIG. 12, a control unit 115 is provided in the connector 110. Presence or absence of the overlapping area $R_3$ or the blind spot area $R_4$ is determined using an image signal generated by the driver signal processing circuit 112, and in a case where there is the overlapping area R3 or the blind spot area R4, a size thereof is obtained.

Further, also in a case where the control signal V is generated by the image processing unit 220, presence or absence of the overlapping area $R_3$ or the blind spot area R4 is determined using an image signal obtained by the image processing unit 220, and in a case where there is the overlapping area $R_3$ or the blind spot area $R_4$, the size thereof is obtained.

In this case, it is preferable that the control unit 115 or the image processing unit 220 generates the control signal V so as to achieve at least one of a decrease in the overlapping area overlapping between the front-view image and the side-view image in the captured images including the front-view image and the side-view image and a decrease in the blind spot area in the visual fields of the captured image.

According to the embodiment, in a case where presence of the lesion site X is found in the captured image displayed on the monitor 300, an endoscope operator may adjust the deflection characteristics of the optical elements 142 and 152 by operating the operation button 124 while viewing the displayed image of the lesion site X. In this case, when the endoscope operator presses the operation button 124, an instruction signal for adjusting the deflection characteristics of the optical elements 142 and 152 is transmitted to the control unit 115 illustrated in FIG. 12. The control unit 115 generates the control signal V according to the instruction signal to adjust the deflection characteristics of the optical elements 142 and 152. When the captured image after the adjustment of the deflection characteristics is displayed on the monitor 300, the endoscope operator further repeats the operation by the operation button 12 for the adjustment of the deflection characteristics.

According to the embodiment, it is preferable that the control unit 115 or the image processing unit 220 generates the control signal V by extracting the overlapping area $R_3$ between the front-view image and the side-view image from pixel values of the captured images and determining the deflection characteristic of the incident light according to the size of the overlapping area $R_3$. For presence or absence of the overlapping area $R_3$, for example, even in a case where the lesion site X is not present, the presence or absence of the overlapping area $R_3$ and the size of the overlapping area $R_3$ can be obtained using an image of a surface of a biological tissue as an object, whose brightness has changed due to unevenness of the surface, or an image distinguishable from other portions of a characteristic portion such as a color change appearing on the surface of the biological tissue or a blood vessel on the object. Since the control signal V currently applied to the optical elements 142 and 152 is known, and positions of the visual field range $R_1$, the visual field range $R_1^*$, or the visual field range $R_1^{**}$, the visual field range $R_2$, the visual field range $R_2^*$, or the visual field range $R_2^{**}$ in the captured image are known, a range in which the overlapping area $R_3$ may be generated can be specified approximately in advance. Therefore, the presence or absence of the overlapping area $R_3$ and the size of the overlapping area $R_3$ can be efficiently obtained by examining the pixel values of the captured images within the range that can be specified in advance.

According to the embodiment, it is preferable that the control unit 115 or the image processing unit 220 generates the control signal V by obtaining a size of the blind spot area between the front-view image and the side-view image from an amount of positional displacement at an end of the front-view image or the side-view image between an image of a linearly extending portion in the front-view image of the biological tissue captured by the image sensor 108 and an image of the same linearly extending portion in the side-view image, and determining the deflection direction of the incident light incident on the optical elements 142 and 152 according to the size. Since the currently applied control signal V is known, positions of the end of the front-view image and the end of the side-view image can be approximately known. Examples of the linearly extending portion include a distal tip edge of a fold in the large intestine, a blood vessel appearing on the surface of the biological tissue, and a linearly extending boundary portion that separates the lesion site X and a healthy site. The linearly extending portion preferably extends substantially linearly, but may be a curve whose direction changes smoothly. In the case of the smoothly changing curve, for a portion interrupted by the blind spot area $R_4$, by extending an image of the smoothly changing curve from one linearly extending portion, it is possible to obtain the amount of positional displacement of the end of the front-view image or the side-view image relative to the other linear image.

According to the embodiment, the side window 150 provided at the distal tip 132 is provided so as to circle in a circumferential direction of the cylindrical member 133 surrounding the image sensor 108. In this case, it is preferable that the optical element 152 is provided at each of a plurality of positions along the circumferential direction so that the deflection characteristic, that is, the deflection direction of the incident light has a distribution in the circumferential direction of the cylindrical member 133. Since the position of the distal tip 132 is offset from the center in a tube of an organ, the presence or absence of the overlapping area $R_3$ and the blind spot area $R_4$ changes on the circumference, and the sizes of the overlapping area $R_3$ and the blind spot area $R_4$ are also distributed on the circumference according to an offset amount of the position of the distal tip 132. Since the optical element 152 is provided at each of the plurality of positions along the circumferential direction of the side window 150, the overlapping area $R_3$ and the blind spot area $R_4$ can be reduced or eliminated in the image displayed on the monitor 300.

According to the embodiment, it is preferable that a maximum half angle of view of the objective lens 106 is 90 degrees or more and more than 90 degrees. The maximum half angle of view is more preferably 100 degrees or more, still more preferably 110 degrees or more, and particularly preferably 112 degrees or more. As the electronic scope 100 captures an image in a wide visual field range in this way, for example, it is possible to efficiently capture, in the side-view image, the presence of the lesion site X that is at a base part of the fold in the large intestine or the like and is interrupted by the fold pushed down, before the fold is pushed down.

The control unit 115 or the image processing unit 220 obtains the presence or absence and the size of the overlapping area $R_3$ or the blind spot area $R_4$ using the captured images, but the presence or absence and the size of the overlapping area $R_3$ or the blind spot area $R_4$ may be obtained using a prediction model obtained by performing machine learning in advance. The control unit 115 or the image processing unit 220 includes the prediction model (AI model) obtained by performing machine learning in advance of a relationship between the captured images including the front-view image and the side-view image and the size of the overlapping area $R_3$ or the blind spot area $R_4$. The control unit 115 or the image processing unit 220 determines the deflection characteristic (deflection direction) of the incident light incident on the optical elements 142 and 152 by obtaining the presence or absence and the size of the overlapping area $R_3$ or the blind spot area $R_4$ from the pixel values of the captured images of the biological tissue captured by the image sensor 108 using this prediction model. In a case where the prediction model performs machine learning of the relationship between the captured images and the size of the blind spot area $R_4$, for example, the prediction model performs machine learning in advance of a relationship between a positionally displaced position (position with positional displacement) and an amount of positional displacement between the front-view image and the side-view image of the linearly extending portion in the captured image and the size of the blind spot area $R_4$.

In a case where the prediction model uses a neural network, the prediction model includes a model of a deep neural network (DNN) predictably formed by deep learning, a model by a random forest method using a tree structure, a model using LASSO regression, or a nonlinear function using a polynomial, Kriging, a radial basis function network (RBF network (RBFN)), or the like.

In a case where the prediction model is used, machine learning of the relationship with the overlapping area $R_3$ or the blind spot area $R_4$ may be performed in advance using the information regarding the control signal V together with the captured images including the front-view image and the side-view image. In this case, when the prediction model predicts and obtains the size of the overlapping area $R_3$ or the blind spot area $R_4$, the information regarding the control signal V is also input to the prediction model as input data in addition to the captured images.

Hitherto, the endoscope and the endoscope system of the present invention has been described in detail, but the present invention is not limited to the above-described embodiment. As a matter of course, various improvements or modifications may be made within the scope not departing from the concept of the present invention.

The invention claimed is:

1. An endoscope that captures an image of a biological tissue in a body cavity, the endoscope comprising:
   an image sensor configured to capture the image of the biological tissue;
   an objective lens that simultaneously forms, as captured images, a front-view image of the biological tissue obtained through a front window facing a front side of a light receiving surface of the image sensor and a side-view image of the biological tissue obtained through a side window facing a lateral side as compared with the front window, on the light receiving surface; and
   an optical element that is provided in at least one of the front window and the side window, and changes a visual field range of at least one of the front-view image and the side-view image by adjusting a deflection characteristic of incident light with a control signal.

2. The endoscope according to claim 1, further comprising
   a control unit that generates the control signal,
   wherein the control unit generates the control signal such that at least one of a decrease in an overlapping area overlapping between the front-view image and the side-view image in the captured images including the front-view image and the side-view image and a decrease in a blind spot area in visual fields of the captured images is achieved.

3. The endoscope according to claim 2, wherein the control unit generates the control signal by extracting the overlapping area between the front-view image and the side-view image from pixel values of the captured images, and determining the deflection characteristic of the incident light according to a size of the overlapping area.

4. The endoscope according to claim 3, wherein the control unit includes a prediction model obtained by performing machine learning in advance of a relationship between the captured images including the front-view image and the side-view image and the size of the overlapping area, and determines, using the prediction model, the deflection characteristic of the incident light by obtaining presence or absence and the size of the overlapping area from the pixel values of the captured images of the biological tissue captured by the image sensor.

5. The endoscope according to claim 2, wherein the control unit generates the control signal by obtaining a size of the blind spot area between the front-view image and the side-view image from an amount of positional displacement at an end of the front-view image or the side-view image between an image of a linearly extending portion in the front-view image of the biological tissue captured by the image sensor and an image of the linearly extending portion in the side-view image, and determining the deflection characteristic of the incident light according to the size.

6. The endoscope according to claim 5, wherein the control unit includes a prediction model obtained by performing machine learning in advance of a relationship between a positionally displaced position and an amount of positional displacement of the linearly extending portion in the captured images and the size of the blind spot area, and determines, using the prediction model, the change amount by obtaining presence or absence and the size of the blind spot area from the positionally displaced position and the amount of positional displacement of the linearly extending portion obtained from the pixel values of the captured images of the biological tissue captured by the image sensor.

7. The endoscope according to claim 1, wherein
   the side-view window is provided so as to circle in a circumferential direction of a cylindrical member surrounding the image sensor, and
   the optical element is provided at each of a plurality of positions along the circumferential direction such that the deflection characteristic has a distribution in the circumferential direction.

8. The endoscope according to claim 1, wherein a maximum half angle of view of the objective lens is 90 degrees or more.

9. An endoscope system comprising: an endoscope that captures an image of a biological tissue in a body cavity; and a processor for an endoscope that performs image processing on the image of the biological tissue captured by the endoscope, the endoscope including:
an image sensor configured to capture the image of the biological tissue;
an objective lens that simultaneously forms, as captured images, a front-view image of the biological tissue obtained through a front window facing a front side of a light receiving surface of the image sensor and a side-view image of the biological tissue obtained through a side window facing a lateral side as compared with the front window, on the light receiving surface; and
an optical element that is provided in at least one of the front window and the side window, and changes a visual field range of at least one of the front-view image and the side-view image by adjusting a deflection characteristic of incident light with a control signal,
the processor for an endoscope including an image processing unit that generates a control signal for performing image processing on the image of the biological tissue and controlling the deflection characteristic of the incident light,
wherein the image processing unit generates the control signal such that at least one of a decrease in an overlapping area overlapping between the front-view image and the side-view image in the captured images including the front-view image and the side-view image and a decrease in a blind spot area in visual fields of the captured images is satisfied.

* * * * *